Sept. 2, 1930.   F. S. CRANE   1,774,700
MEANS FOR PARKING AUTOMOTIVE VEHICLES
Original Filed Oct. 13, 1927   3 Sheets-Sheet 1

INVENTOR:
FRED S. CRANE
BY
ATTORNEYS

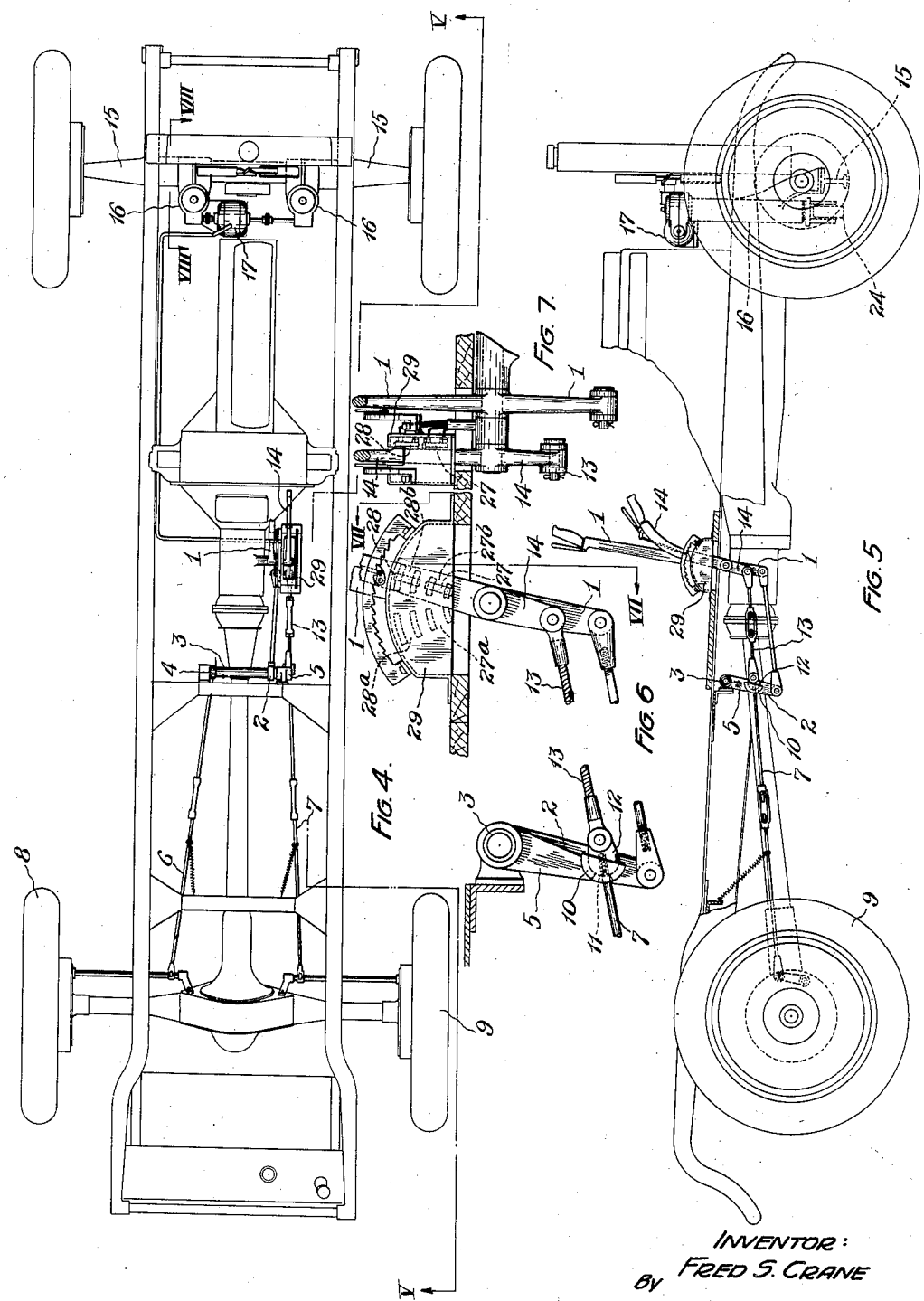

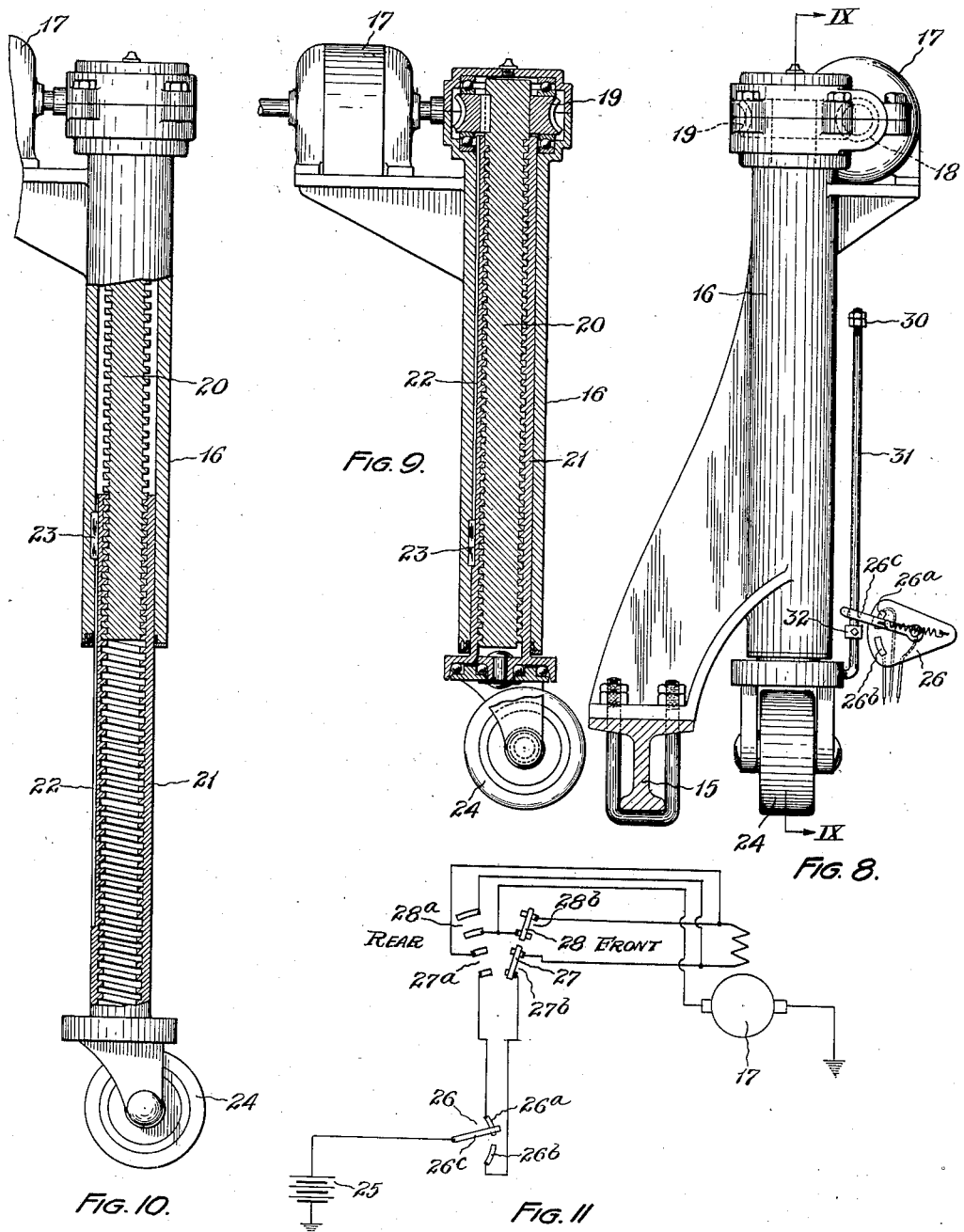

Patented Sept. 2, 1930

1,774,700

UNITED STATES PATENT OFFICE

FRED S. CRANE, OF CLEVELAND, OHIO

MEANS FOR PARKING AUTOMOTIVE VEHICLES

Application filed October 13, 1927, Serial No. 225,917. Renewed January 30, 1930.

This invention relates to improved apparatus for controlling movements of an automotive vehicle.

One of the objects of this invention is to provide means which will enable such vehicle to be parked in a parking space the length whereof is only slightly in excess of the length of the vehicle.

A further object of the invention is to provide apparatus which will permit such vehicle to be rotated about an axis located within the vehicle, this rotation being accomplished effectively by the use of the power from the engine.

A further object of the invention is to provide means for moving one end of such vehicle laterally, substantially without moving the other end, this movement being also accomplished effectively by the use of the power of the engine of the vehicle.

A further object of the invention is to provide means for applying the brake to one wheel only of the vehicle.

A further object of the invention is to provide power means for elevating or lowering one end of the automotive vehicle.

A further object of the invention is to provide means for stopping the elevating or lowering action of the above means automatically at a predetermined position of the elevating or lowering means.

A further object of the invention is to provide automatic means for insuring the safe operation of the above devices.

Further objects of the invention will appear from the drawings and specifications.

The annexed drawings and the following description set forth in detail certain means for carrying out my invention, the disclosed means, however, constituting but one of various mechanical forms in which the principle of my invention may be employed.

Figure 1:
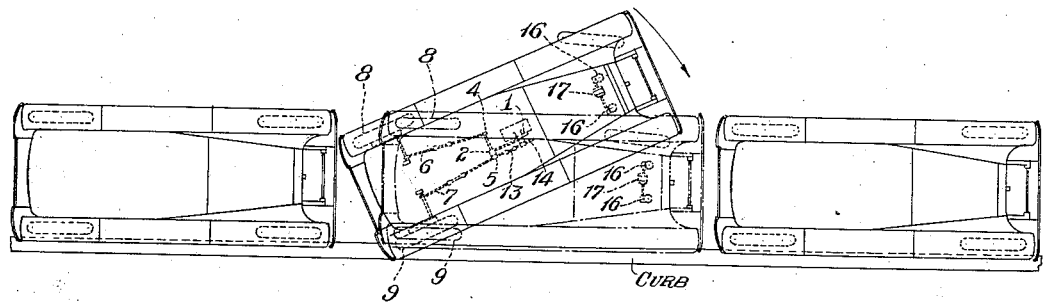
Figure 2:
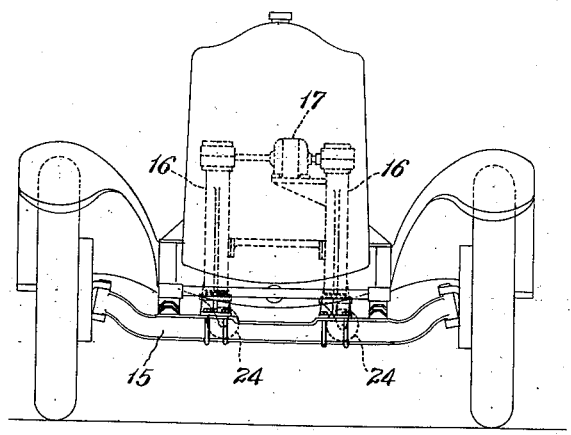
Figure 3:
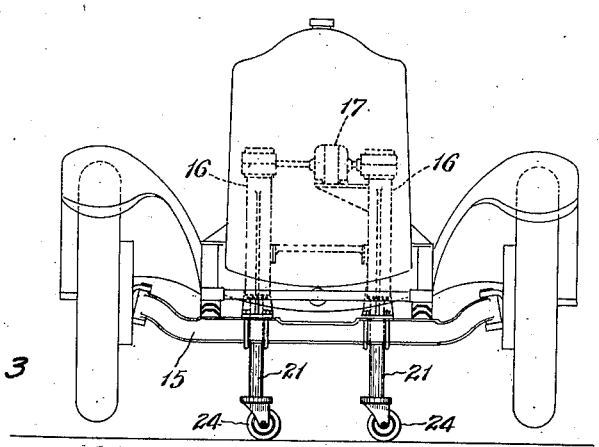

In said annexed drawings: Fig. 1 represents a plan view illustrating the method of parking an automotive vehicle in accordance with my improved invention; Fig. 2 represents a front elevation of an automotive vehicle equipped with my improved elevating and lowering apparatus, this apparatus being shown in its elevated position in this view and the wheels of the vehicle being shown resting on the ground in their normal position; Fig. 3 is a view similar to the above, the apparatus, however, being shown in a position in which it has elevated the wheels of the vehicle from the ground; Fig. 4 is a plan view of the chassis of an automotive vehicle equipped with my invention; Fig. 5 is a side elevation of the chassis shown in Fig. 4, parts being broken away, as indicated by lines V—V in Fig. 4; Fig. 6 is an enlarged view, partly broken away, of a portion of the apparatus shown in Fig. 5; Fig. 7 is a transverse section taken on the line VII—VII of Fig. 6; Fig. 8 is a side view of one of the elevating and lowering devices, this view being taken on the line VIII—VIII of Fig. 4; Fig. 9 is a vertical section taken on the line IX—IX of Fig. 8; Fig. 10 is a view similar to Fig. 9 but showing the two telescoping members of the elevating device in their extended position; and Fig. 11 is a wiring diagram showing automatic interlocking electrical connections between the several elements of my invention.

In its specific adaptation disclosed herein, the essential features of my invention consist (1) of special means for applying a special brake to one of the rear wheels of the automotive vehicle without interfering with the satisfactory operation of the other brakes (provided for the usual other braking purposes) and without any substantial alteration therein, and (2) in the provision of power devices for elevating or lowering the front end of the automotive vehicle preferably simultaneously with the application or release, respectively, of the special brake on the rear wheel. Specific interlocking means are also provided so that when such special brake is applied to its rear wheel, the power means for elevating the front end of the car will automatically be started; and means are interposed in this mechanism for automatically stopping this elevating means when the front wheels of the automotive vehicle have been elevated a sufficient distance above the ground. The interlocking mechanism is so arranged that under these circumstances it is in the correct position to effect the lowering of the automotive vehicle as soon as the special brake applying means is thrown into the releasing position.

Means for applying brake to one rear wheel

Referring to Figs. 4, 5, 6 and 7, 1 represents the usual emergency brake lever which is connected by a suitable link 1ª to a depending lever 2 fixed to a shaft 3. To this shaft 3 are fixedly secured two additional depending levers 4 and 5. The lever 4 is connected by means of the link 6 to any standard internal brake mechanism on the left-hand rear wheel 8, and the lever 5 is connected by a link 7 to like brake mechanism on the right-hand rear wheel 9.

The apparatus above described comprises the usual emergency brake system. The depending lever 5, however, is provided with a socket 10 and an opening 11 adapted to permit the passage therethrough of the link 7. The socket 10 supports a spherical lug 12 which is rigidly connected to one end of the link 7 and which is also connected to one end of an adjustable flexible link 13, the other end of which is pivotally connected to a parking brake lever 14. This lever is pivoted intermediately of its length and is provided at the upper end with the usual handle and latch which is adapted to hold this parking brake lever 14 in the desired position. This parking brake lever is provided with additional electrical contacts to control the power elevating and lowering means and which will be hereinafter described.

In the operation of the above described apparatus, it will be evident that when the emergency brake lever handle is pulled toward the driver, the emergency brakes will be applied to both of the rear wheels 8 and 9 of the automotive vehicle in the usual manner. If it is desired, however, to apply the emergency brake only to the right wheel 9, this can be accomplished by pulling the handle of the parking brake lever 14 to the rear which causes the link 13 to move forward, thus pulling the lug 12 out of the socket 10 and also pulling the link 7 to the right, thus applying the brake to the right rear wheel 9 without affecting the released position of the brake mechanism of the wheel 8.

The usual service brake system of the automotive vehicle is independent of this emergency brake system and is not affected in any manner by this invention; for this reason, it is not considered necessary to illustrate or describe any of the elements of this usual service brake.

Elevating and lowering mechanism

Referring to Figs. 2, 3, 4, 5, 8 and 9, fixedly mounted on the front axle 15 are two stationary tubular supports 16. The upper end of one of these supports is provided with a small platform supporting an electric motor 17 which has mounted on each end of its shaft 17ª a worm 18 engaging a worm-gear 19, this worm-gear being fixed to the upper end of a screw 20. The thread of the screw 20 engages a similar thread on the interior of a sleeve 21, this sleeve being provided on its outer surface with a long key-way 22 engaging a key 23 mounted in the stationary tubular support 16. The lower end of each sleeve 21 is provided with a ball-bearing swivel caster 24 which is preferably provided with a rubber tire. This apparatus is also equipped with certain safety electric stopping devices which will be hereinafter described.

The operation of the elevating and lowering devices is as follows: When the motor 17 is energized, as by current from the storage battery, the worm-gears 19 together with the screws 20 to which the worm-gears are keyed, will be caused to rotate. This rotation will cause the sleeves 21 to advance in a downwardly direction, as shown in Fig. 9, due to the fact that the keys 23 prevent rotation of the sleeves. The sleeves in their fully extended position will be as shown in Fig. 10. It will be understood that the ball bearings provided in the upper end of each tubular support 16 will absorb the thrust occasioned by the drive. The motor 17 being directly connected to both of the elevating and lowering devices, will drive both devices simultaneously.

Control for elevating and lowering device

Referring to Figs. 6, 8 and 11, it will be noted that the motor for the elevating and lowering devices consists of a direct current motor 17. The source of current for this motor is the usual storage battery 25. From this battery the current is conducted to the limit and reversing switch 26 illustrated in Figs. 8 and 11. This reversing switch is of the snap-switch type and is provided with a finger 26ᶜ adapted to engage either one of two contacts 26ª or 26ᵇ. The parking brake lever 14 is also provided with two contacts 27 and 28, each of which is adapted to engage two pairs of contacts, 27ª and 27ᵇ, and 28ª and 28ᵇ respectively, which are mounted in a casing 29 adjacent to the parking brake lever 14. The position of the several parts shown in the wiring diagram, Fig. 11, is such that when the sleeves 21 of the elevating and lowering device are in the up position the parking brake lever 14 is in the forward or released position, as shown in Figs. 5 and 6. The operation of this control device is as follows:

When it is desired to cause the elevating device to feed the sleeves 21 and swivel casters 24 downward, the handle of the parking brake lever 14 is pulled toward the rear, or left, as illustrated in Figs. 5, 6 and 11. When the lever is in this rear position the current will be conducted from the battery 25 to the limit and reversing switch 26 through contact 26ª and will thence be conducted across the pair of terminals 27ª to one terminal of the field, will pass through the field and return across the pair of terminals 28ª, whence it is conducted to the motor 17 and then to ground. The motor thus energized will cause the sleeves and swivel casters to travel downwardly until the upper adjustable collar 30 on a rod 31 fixedly attached to a portion of the sleeve 21, strikes the lever 26ᶜ of the limit-and-reversing switch 26. This lever will then be moved off the upper contact 26ª on this switch 26 and on to the lower contact 26ᵇ thereof. This automatically opens the circuit and stops the motor. When it is desired to raise the sleeves 21 and casters 24 of the elevating and lowering device, the handle of the parking brake lever 14 is moved to the forward position. This immediately permits a current to flow from the battery 25 to the lower contact 26ᵇ of the switch 26 whence it travels across the pair of contacts 27ᵇ to one terminal of the field of the motor, whence it travels through the field and across the pair of contacts 28ᵇ and then travels to the motor 17.

It will be noted that the direction of travel of the current to the motor 17 is the same in both positions of the parking-brake lever; it should be noted, however, that the direction of travel of the current through the field when the parking brake lever is in the forward position, is in a direction opposite to that in which it travels when the parking brake lever is in the rear position. This reversal of direction of travel of the current through the field of the direct current motor 17, as is well known, causes the reversal of direction of the motor. It will therefore be evident that the motor, traveling in the opposite direction as the brake lever handle is moved forward, will cause the sleeves 21 and swivel casters 24 to rise. This operation continues until the lower collar 32 on the rod 31 strikes against the lever 26ᶜ of the switch 26. This switch 26 will then again be in the position shown in Fig. 11 and will be in the correct position to permit the energizing of the motor to drive the sleeves 21 in the downward direction as soon as the parking brake lever 14 is pulled to the rear.

*Operation and co-ordination of the braking and elevating and lowering mechanism*

One of the principal uses contemplated for this invention is in parking in a space which happens to be only slightly longer than the length of the vehicle. In its use for this purpose, it is contemplated that the driver will back his car into the parking space, which leaves the vehicle in the position shown in full lines in the center of Fig. 1. It is clearly evident that it would ordinarily be impossible to so control the movement of the vehicle in the confines of the small space available, to move it to a position parallel with the curb. With my invention, however, this is a comparatively simple matter. When the vehicle has been backed to the position shown in full lines in Fig. 1, the driver permits the engine to continue running but disengages the clutch or shifts gears into neutral so that the engine is not driving the wheels of the vehicle. The driver then pulls the handle of the parking brake lever to the rear, which immediately applies the brake to the rear right wheel 9 and fixes this wheel against rotation. This same rearward movement of the parking brake lever causes the casters of the elevating and lowering mechanism to travel downward as described above. This downward travel continues until the casters have elevated the front wheels of the automotive vehicle a sufficient distance above the level of the pavement, at which time they stop automatically as likewise explained hereinbefore. The driver of the vehicle then applies the power to the propeller shaft, preferably in low gear. This power drives the differential and, due to the fact that the rear right wheel 9 is locked against rotation, all of the drive will be to the rear left wheel 8. This will cause the front end of the vehicle to move in the direction indicated by the arrow in Fig. 1, pivoting about the rear right wheel 9. The vehicle will thus be moved to the position shown in broken lines in Fig. 1. If the vehicle is left parked with the rear right wheel locked and the front end elevated, and the driver desires to again move the car, it is only necessary for him to start the engine, throw his gears into reverse, and apply the power to the propeller shaft, which will cause the front end of the automotive vehicle to swing in a direction opposite to that indicated by the arrow in Fig. 1, again pivoting about the locked right rear wheel 9. When he has moved the vehicle out a sufficient distance angularly from the curb the driver moves the parking brake lever 14 to the released position, which simultaneously releases the brake on the right rear wheel 9 and elevates the swivel casters 24, thus permitting the front wheels to again rest on the pavement. The driver is then in position to drive the vehicle normally.

It is understood, of course, that the emergency brake may or may not be applied while the vehicle is in the parked position, without affecting the mechanism of this invention. It is also possible, of course, for the driver, if he so desires, to lower the front wheels of the vehicle by releasing the brake lever while the vehicle is parked. In that event, it will be necessary for him to again raise the front end of the vehicle before attempting to swing it out into traffic.

It is clearly evident that this apparatus can be used for many other purposes in addition to the method of parking an automotive vehicle as described above, some of these uses being enumerated at the beginning of this specification.

Having thus described my invention, what I claim is:—

1. In an automotive vehicle, the combination of a chassis supported on driving and driven wheels; means for locking one driving wheel against rotation; means for elevating the driven wheels; and power means for driving the other driving wheel thereby to effect a lateral movement of the front of the automotive vehicle, a single lever for controlling the operation of said locking means and said elevating means, and means for automatically stopping said elevating means.

2. In an automotive vehicle, the combination of a chassis supported on driving and driven wheels; means for locking one driving wheel against rotation, and power means for raising the driven wheels from the ground, said means including swivel casters, and a single lever for controlling the operation of said locking means and said elevating means.

3. In an automotive vehicle, the combination of an engine and a chassis supported on the driving and driven wheels; means for locking one of the driving wheels against rotation; means for elevating the driven wheels from the ground, said locking means and elevating means being so arranged as to be simultaneously operated, and means for driving the other driving wheel, said driving means including a differential.

4. In an automotive vehicle, the combination of a chassis supported on driving and driven wheels; means for raising the wheels at one end of the vehicle from the ground and including means for automatically discontinuing the raising action, and power means for lateral rotation of the vehicle about a vertical axis within the area of the vehicle.

5. In an automotive vehicle, the combination of a chassis supported on driving and driven wheels; means for locking one of the driving wheels against rotation; and means for elevating the driven wheels from the ground, said means including a plurality of swivel caster supports.

6. In an automotive vehicle, the combination of a chassis supported on driving and driven wheels; means for locking the one driving wheel against rotation; means for raising the driven wheels; and means for simultaneously effecting the locking of the driving wheel and the raising of the front wheels.

7. In an automotive vehicle, the combination of a chassis supported on driving and driven wheels; means for locking one driving wheel against rotation; power means for raising the driven wheels from the ground; and automatic means for stopping the raising action when the wheels have been raised a sufficient distance from the ground.

8. In an automotive vehicle, the combination of a chassis supported on rear and front wheels, means for raising the driven wheels from the ground and for simultaneously locking one of said rear wheels, and means for moving the front of the vehicle laterally.

9. In an automotive vehicle having two front and two rear wheels, the combination of means for locking one driving wheel against rotation, means for elevating both front wheels, power means for driving the other driving wheel to effect a lateral movement of the front of the vehicle, means interconnecting said elevating means and said locking means so that they may be simultaneously operated.

10. In an automotive vehicle having two front and two rear wheels, the combination of means for locking one driving wheel against rotation, means for elevating both driven wheels, power means for driving the other driving wheel to effect a lateral movement of the front of the vehicle, means interconnecting said elevating means and said locking means so that they may be simultaneously operated, and means for automatically discontinuing the operation of said elevating means.

11. In an automotive vehicle having two front and two rear wheels, the combination of means for locking one driving wheel against rotation, means for elevating both driven wheels, power means for driving the other driving wheel to effect a lateral movement of the front of the vehicle, means interconnecting said elevating means and said locking means so that they may be simultaneously operated without effecting said power means.

12. In an automotive vehicle having two front and two rear wheels, the combination of means for locking one driving wheel against rotation, means for elevating both driven wheels, power means for driving the other driving wheel to effect a lateral movement of the front of the vehicle, means interconnecting said elevating means and said locking means so that they may be simultaneously operated, said elevating means including one or more swiveled casters and power operated means for raising and lowering the same.

In testimony whereof, I hereunto affix my signature.

FRED S. CRANE.